US011261371B2

(12) United States Patent
Solastiouk et al.

(10) Patent No.: US 11,261,371 B2
(45) Date of Patent: Mar. 1, 2022

(54) USE OF ORGANIC ACIDS OR A SALT THEREOF IN SURFACTANT-BASED ENHANCED OIL RECOVERY FORMULATIONS AND TECHNIQUES

(71) Applicant: INDORAMA VENTURES OXIDES LLC, The Woodlands, TX (US)

(72) Inventors: Pierre Solastiouk, Mt. Mihiel (FR); Luis C. Salazar, Spring, TX (US); David C. Lewis, Conroe, TX (US)

(73) Assignee: Indorama Ventures Oxides LLC, The Woodlands, TX (US)

( * ) Notice: Subject to any disclaimer, the term of this patent is extended or adjusted under 35 U.S.C. 154(b) by 0 days.

(21) Appl. No.: 16/783,937

(22) Filed: Feb. 6, 2020

(65) Prior Publication Data
US 2020/0172792 A1    Jun. 4, 2020

Related U.S. Application Data

(62) Division of application No. 14/758,607, filed as application No. PCT/US2014/039083 on May 22, 2014, now abandoned.

(60) Provisional application No. 61/828,331, filed on May 29, 2013.

(51) Int. Cl.
*C09K 8/584* (2006.01)
*C09K 8/60* (2006.01)
*E21B 43/16* (2006.01)

(52) U.S. Cl.
CPC .............. *C09K 8/584* (2013.01); *C09K 8/602* (2013.01); *E21B 43/16* (2013.01)

(58) Field of Classification Search
CPC .......... C09K 8/584; C09K 8/602; C09K 8/32; C09K 8/68; C09K 8/74; E21B 43/16
See application file for complete search history.

(56) References Cited

U.S. PATENT DOCUMENTS

| | | | |
|---|---|---|---|
| 2,910,123 A * | 10/1959 | Elkins | E21B 43/17 166/271 |
| 3,434,545 A | 3/1969 | Bombardieri | |
| 3,811,504 A * | 5/1974 | Flournoy | C09K 8/584 166/270.1 |
| 3,890,239 A | 6/1975 | Dycus et al. | |
| 4,463,806 A | 8/1984 | Hurd | |
| 4,601,836 A | 7/1986 | Jones | |
| 4,762,573 A | 8/1988 | Biverstedt | |
| 5,985,793 A * | 11/1999 | Sandbrink | A01N 43/40 504/363 |
| 6,258,859 B1 | 7/2001 | Dahayanake et al. | |
| 6,302,209 B1 * | 10/2001 | Thompson, Sr | B01F 17/0028 166/305.1 |
| 6,306,806 B1 | 10/2001 | St. Lewis et al. | |
| 6,342,470 B1 | 1/2002 | Aronson et al. | |
| 6,425,959 B1 | 7/2002 | Man | |
| 6,984,610 B2 | 1/2006 | VonKrosigk et al. | |
| 7,488,709 B2 | 2/2009 | Ribery et al. | |
| 7,584,791 B2 | 9/2009 | Robb et al. | |
| 7,629,299 B2 | 12/2009 | Berger et al. | |
| 8,193,143 B2 | 6/2012 | Lant | |
| 9,068,148 B2 | 6/2015 | Tamareselvy et al. | |
| 2004/0023817 A1 | 2/2004 | Taylor et al. | |
| 2005/0199395 A1 | 9/2005 | Berger et al. | |
| 2006/0100127 A1 | 5/2006 | Meier et al. | |
| 2006/0185845 A1 | 8/2006 | Shpakoff et al. | |
| 2007/0191633 A1 | 8/2007 | Berger et al. | |
| 2008/0190609 A1 | 8/2008 | Robb et al. | |
| 2008/0196893 A1 | 8/2008 | Berger et al. | |
| 2008/0234147 A1 * | 9/2008 | Li | C09K 8/74 507/215 |
| 2009/0107681 A1 | 4/2009 | Hough et al. | |
| 2009/0270281 A1 | 10/2009 | Steinbrenner et al. | |
| 2011/0046024 A1 | 2/2011 | Campbell et al. | |
| 2011/0048721 A1 | 3/2011 | Pope et al. | |
| 2011/0190174 A1 | 8/2011 | Weerasooriya et al. | |
| 2011/0197927 A1 | 8/2011 | Sendor-Muller et al. | |
| 2011/0281779 A1 | 11/2011 | Weerasooriya et al. | |
| 2011/0290482 A1 | 12/2011 | Weerasooriya et al. | |
| 2012/0101010 A1 | 4/2012 | Weerasooriya et al. | |
| 2013/0068312 A1 | 3/2013 | Sanders | |
| 2013/0068457 A1 | 3/2013 | Thach et al. | |
| 2014/0034306 A1 | 2/2014 | Southwick et al. | |
| 2014/0034307 A1 | 2/2014 | Southwick et al. | |
| 2014/0260466 A1 * | 9/2014 | Rehage | C05F 11/00 71/23 |

FOREIGN PATENT DOCUMENTS

| | | |
|---|---|---|
| CN | 102851007 A | 1/2013 |
| EP | 2 591 010 A | 5/2013 |
| WO | 2006/055549 A | 5/2006 |
| WO | 2011/130310 A | 10/2011 |
| WO | 2011/150060 A | 12/2011 |
| WO | 2012/027757 A | 3/2012 |
| WO | 2014/022616 A | 2/2014 |
| WO | 2014/022626 A | 2/2014 |

* cited by examiner

OTHER PUBLICATIONS https://www.stepan.com/products-markets/product/MAKON14.html downloaded on May 10, 2021.*

*Primary Examiner* — Kumar R Bhushan

(57) ABSTRACT

The present disclosure provides a surfactant formulation for use in treating and recovering fossil fluid from a subterranean formation. The surfactant formulation includes a non-ionic surfactant, organic acid selected from citric acid, diglycolic acid, glycolic acid and a salt thereof and injection water. The surfactant formulation may be injected into one or more injection wells located within the subterranean formation and fossil fluids can then be subsequently recovered from one or more producing wells.

15 Claims, No Drawings

USE OF ORGANIC ACIDS OR A SALT THEREOF IN SURFACTANT-BASED ENHANCED OIL RECOVERY FORMULATIONS AND TECHNIQUES

CROSS REFERENCE TO RELATED APPLICATIONS

This application is a divisional application of U.S. patent application Ser. No. 14/758,607, filed Jun. 30, 2015, pending, which is the National Phase of International Application PCT/US/2014/039083 filed May 22, 2014, which designated the U.S., and which claims priority to U.S. Pat. App. Ser. No. 61/828,331, filed May 29, 2013. The noted applications are incorporated herein by reference.

FIELD OF THE INVENTION

The present disclosure is directed to surfactant formulation containing a nonionic surfactant, an organic acid selected from citric acid, diglycolic acid, glycolic acid and a salt thereof and injection water and to a process for recovering fossil fluids from subterranean reservoirs employing such surfactant formulations.

BACKGROUND INFORMATION

Fossil fluids are generally recovered from underground formations by penetrating the formation with one or more wells and pumping or permitting the fossil fluid to flow to the surface through the well. In primary recovery, a natural driving energy such as an underlying active water drive or a gas under some minimum pressure may possess sufficient pressure to drive the fluid to the well and then to the surface. In many instances, the natural driving energy is insufficient or becomes insufficient to cause the fluid to flow to the well. Thus, a substantial portion of the fossil fluid to be recovered can remain in the formation after depletion of the natural driving energy. In such cases, various secondary or tertiary recovery techniques must be applied to recover the remaining fluid.

One such technique involves the injection of water through one or more injection wells to drive the residual fluid towards a producing well. When the injection of water no longer results in acceptable rates of production, the producing well must either be abandoned or subjected to other processes to further increase extraction. A variety of processes are known including steam flooding, polymer flooding, alkali flooding, miscible flooding with carbon dioxide, and flooding with aqueous surfactant solutions. With respect to flooding with an aqueous surfactant solution, a surfactant package is added to the injection water and injected into the well for the purpose of decreasing the interfacial tension between the injection water and fossil fluid phases thus leading to an increase in fossil fluid extraction. The challenge one skilled in the art faces when implementing such a process is determining an effective combination of components which make up the surfactant package. Many combinations must generally be tried before a suitable surfactant package can be formulated having good tolerance towards the multivalent cations found in the brine of many formations as well as having low adsorption onto rock of the formation. For example:

U.S. Pat. No. 3,811,504 discloses the use of a three surfactant system containing an alkyl sulfate, an alkyl polyethoxylated sulfate, and a polyethoxylated alkylphenol;

U.S. Pat. No. 3,890,239 discloses a surfactant composition useful in recovering oil from a formation that includes an organic sulfonate, a sulfated or sulfonated oxyalkylated alcohol and a polyalkylene glycol alcohol ether;

U.S. Pat. No. 4,463,806 discloses a surfactant package containing a water-soluble ether-linked sulfonate, an alcohol and a petroleum sulfonate or alkylbenzene sulfonate;

U.S. Pat. No. 7,629,299 discloses the use of alcohol ether sulfonates derived from unsaturated alcohol ethers;

US Pat. Publ. No. 2005/01999395 discloses the use of an alkali and an alkylaryl sulfonate surfactant derived from alpha-olefins for recovering oil from a formation;

US Pat. Publ. No. 2006/0185845 discloses a composition that includes an aliphatic anionic surfactant and an aliphatic nonionic additive for use in treating a formation;

US Pat. Publ. No. 2007/0191633 discloses a blend for recovering oils that contains water or brine, an alcohol or alcohol ether and a bifunctional anionic surfactant;

US Pat. Publ. No. 2009/0270281 discloses a surfactant mixture including a hydrocarbon radical having 12-30 carbons and a branched hydrocarbon having 6 to 11 carbon atoms for use in tertiary oil extraction;

US Pat. Publ. No. 2011/0046024 discloses the use of an alkylated hydroxyaromatic sulfonate, a solvent, a passivator and a polymer for recovering oil from a formation;

US Pat. Publ. No. 2011/0048721 discloses the use of high molecular weight sulfated internal olelfin sulfonate sulfates and high molecular weight dialkylphenol alkoxylate sulfonate sulfates for use in oil recovery;

US Pat. Publ. No. 2011/0190174 discloses tristyryiphenol alkoxylate sulfates and their use as a surfactant in oil recovery applications;

U.S. Pat. Publ. No. 2011/0281779 discloses the use of an anionic ether surfactant comprising a branched hydrophobe group derived from a Guerbet alcohol; and U.S. Pat. Publ. No. 2013/0068312 which discloses a nonionic surfactant and a metal salt.

Despite the state of the art, there is a continuing need for new surfactant packages and formulations useful in the recovery of fossil fluids, especially under high salinity and high temperature conditions. Provided herein are surfactant packages and surfactant formulations addressing the needs in the art and methods of using such formulations.

SUMMARY OF THE INVENTION

The present disclosure relates to a surfactant formulation for treating a fossil fluid-bearing subterranean formation comprising a nonionic surfactant, an organic acid selected from citric acid, diglycolic acid, glycolic acid and a salt thereof and injection water.

In a further embodiment, the present disclosure provides a process for preparing a surfactant formulation for use in treating a fossil fluid-bearing subterranean formation by combining a nonionic surfactant with an organic acid selected from citric acid, diglycolic acid, glycolic acid and a salt thereof and injection water.

In a still further embodiment, the present disclosure provides a process for the recovery of fossil fluids from a subterranean formation by injecting a surfactant formulation containing a nonionic surfactant, an organic acid selected from citric acid, diglycolic acid, glycolic acid and a salt thereof and injection water into one or more injection wells located within the subterranean formation and recovering the fossil fluids from one or more producing wells. The injection well and the producing well may be the same well or different wells.

In yet another embodiment, the present disclosure relates to a surfactant package for use in treating a fossil fluid-bearing subterranean formation comprising a nonionic surfactant and an organic acid selected from citric acid, diglycolic acid, glycolic acid and a salt thereof.

DETAILED DESCRIPTION

If appearing herein, the term "comprising" and derivatives thereof are not intended to exclude the presence of any additional component, step or procedure, whether or not the same is disclosed herein. In order to avoid any doubt, all formulations claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical object of the article. By way of example, "a nonionic surfactant" means one nonionic surfactant or more than one nonionic surfactant.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

For methods of treating a fossil fluid-bearing subterranean formation, the term "treating" includes placing a chemical within the subterranean formation using any suitable manner known in the art, for example, pumping, injecting, pouring, releasing, displacing, squeezing, spotting, or circulating the chemical into a well, well bore or subterranean formation.

The term "fossil fluids" include oleaginous materials such as those found in oil field deposits, oil shales, tar sands, heavy oil deposits, and the like. The fossil fluids are generally a mixture of naturally occurring hydrocarbons that can be refined into diesel, gasoline, heating oil, jet oil, kerosene and other products called petrochemicals. Fossil fluids derived from subterranean formations may include, but are not limited to, kerogen, bitumen, pyrobitumen, asphaltenes, oils or combinations thereof.

The term "alkyl" is inclusive of both straight chain and branched chain groups and of cyclic groups. Straight chain and branched chain groups may have up to 30 carbon atoms unless otherwise specified. Cyclic groups can be monocyclic or polycyclic, and in some embodiments, can have from 3 to 10 carbon atoms. The term "alkylene" is the divalent form of the alkyl groups defined above.

The term "aryl" includes carbocyclic aromatic rings or ring systems, for example, having 1, 2 or 3 rings and optionally containing at least one heteroatom (e.g. O, S or N) in the ring. Examples of aryl groups include phenyl, naphthyl, biphenyl, fluorenyl, furyl, thienyl, pyridyl, quionlinyl, isoquinlinyl, indoyl, isoindolyl, triazolyl, pyrrolyl, tetrazolyl, imidazolyl, pyrazolyl, oxazolyl, and thiazolyl.

The term "alkylaryl" refers to an aryl moiety to which an alkyl group is attached.

The term "alkylphenol" refers to a phenol moiety to which an alkyl group is attached.

The term "alkali metal" refers to lithium, sodium or potassium.

The term "alkaline earth metal" refers to calcium, barium, magnesium or strontium.

The term "lower carbon chain alcohols" refers to alcohols having no more than 10 carbon atoms.

As used herein, a "surfactant" refers to a chemical compound that lowers the interfacial tension between two liquids.

The term "nonionic surfactant" refers to a surfactant where the molecules forming the surfactant are uncharged.

As used herein, the term "substantially free" means, when used with reference to the substantial absence of a material in a formulation, that such a material is present, if at all, as an incidental impurity or by-product. In other words, the material does not affect the properties of the formulation.

The phrase "subterranean formation" encompasses both areas below exposed earth and areas below earth covered by water, such as an ocean or fresh water. Temperatures in a subterranean formation may range from about 25° F. to about 300° F. In some embodiments, the temperature of the formation is at least about 100° F., in other embodiments the temperature of the formation is at least about 125° F., while in other embodiments, temperature of the formation is at least about 150° F.

The present disclosure generally provides a surfactant formulation for treating and recovering fossil fluids from a subterranean formation, and especially for treating and recovering fossil fluids from a subterranean formation under high salinity and/or high temperature conditions. According to one embodiment, the surfactant formulation includes a nonionic surfactant, organic acid selected from citric acid, diglycolic acid, glycolic acid and a salt thereof and injection water. It has been surprisingly found that the addition of minor amounts of the organic acid or salt thereof to the surfactant formulation adds salinity and hardness tolerance to the formulation, especially at high salinity conditions as well as phase stability at high temperature conditions. When the surfactant formulation is mixed with oil, ultra-low interfacial tensions are also observed. Moreover, additional components usually found in surfactant formulations, such as carboxylated surfactants, that are generally included to improve stability of the surfactant formulation, can be substantially reduced or eliminated thereby speeding up the process of developing an effective formulation as well as decreasing the cost of the formulation. In one particular embodiment, the surfactant formulation is substantially free of carboxylated surfactants.

As noted above, the surfactant formulation includes a nonionic surfactant. The nonionic surfactant can be any compound having a hydrophobic head, a hydrophilic tail and possible intermediate groups. In one embodiment, the nonionic surfactant comprises a compound having a hydrophobic head that is a natural or synthetically-based alkyl group or an alklaryl group and a hydrophilic tail that is an alkoxylate group. The surfactant formulation can comprise one nonionic surfactant or a mixture of nonionic surfactants.

According to one embodiment, the nonionic surfactant is an alkoxylated alkylphenol or an alkoxylated alcohol. The alkoxylated alkylphenol or alkoxylated alcohol comprise one or more repeating $C_1$ to $C_4$ alkylene oxide groups, preferably one or more ethoxylate groups, propoxylate groups or a mixture thereof. In some embodiments, the alkoxylated alkylphenol or alkoxylated alcohol can comprise 2 to 50 alkylene oxide units. According to other embodiments, the alkoxylated alkylphenol or alkoxylated alcohol can comprise 5 to 45 alkylene oxide units, while in still other embodiments, the alkoxylated alkylphenol or alkoxylated alcohol can comprise 10 to 30 alkylene oxide units.

In another embodiment, the alkylphenol is phenol having one or more linear or branched $C_1$ to $C_{25}$ alkyl groups attached, while in other embodiments, the alkylphenol is phenol having one or more linear or branched $C_5$ to $C_{20}$ alkyl groups attached, while in still further embodiments, the alkylphenol is phenol having one or more linear or branched $C_6$ to $C_{14}$ alkyl groups attached. According to one particular embodiment, the alkylphenol is phenol having one or more p-octyl or p-nonyl groups attached.

According to another embodiment, the alcohol is a linear or branched saturated aliphatic alcohol compound comprising 5 to 30 carbon atoms. In still other embodiments, the alcohol is a linear saturated aliphatic alcohol compound comprising 7 to 25 carbon atoms, while in still another embodiment, the alcohol is a saturated aliphatic alcohol compound comprising 10 to 20 carbon atoms.

The alkoxylated alkylphenol or alkoxylated alcohols described above can be produced using one of a number of different catalytic processes. Of these processes, one of the most common includes the use of an alkaline catalyst such as sodium alkoxide, a quaternary ammonium base or sodium hydroxide. At the end of the reaction, an acid (e.g., acetic acid, propionic acid, sulfuric acid, mixtures thereof) is used to neutralize the alkaline catalyst, thereby producing a metal salt.

Metal salt can be suspended in the nonionic surfactant produced in theses processes in concentrations that range from about 500 to about 10000 parts-per-million (ppm), where a value of about 1500 ppm is typical. An example of such a process can be found, among other places, in U.S. Pat. No. 2,677,700, which is incorporated herein by reference in its entirety.

Other catalytic processes for producing the alkoxylated alkylphenol or alkoxylated alcohol include those that use a Lewis Acid catalysis process. An example of this process can be found in U.S. Pat. No. 4,483,941, which is incorporated herein by reference in its entirety, and which describes the alkoxylation of organic materials in the presence of at least one catalyst comprising $BF_3$ and metal alkyls or metal alkoxides, $SiF_4$ and metal alkyls or metal alkoxides, and mixtures thereof. Other catalytic processes include the use of titanium catalysts, such as titanium isopropoxide and/or other titanium trialkoxide. These Lewis Acid catalysis processes, however, also must be neutralized with a base, thereby producing metal salts in concentrations from about 500 to about 2500 parts-per-million (ppm). Also acid catalyzed alkoxylations lead to harmful side products that must be removed prior to use.

An additional catalytic process for preparing the alkoxylated alkylphenol or alkoxylated alcohol can include the use of double metal cyanide (DMC) catalysts. DMC catalysts are known for epoxide polymerization, i.e. for polymerizing alkylene oxides such as propylene oxide and ethylene oxide to yield poly(alkylene oxide) polymers, also referred to as polyether polyols. The catalysts are highly active, and give polyether polyols that have low unsaturation compared with similar polyols made using strong basic catalysts like potassium hydroxide. In addition to the preparation of polyether polyols, the catalysts can be used to make a variety of polymer products, including polyester polyols and polyetherester polyols. The polyols can be used to prepare polyurethanes by reacting them with polyisocyanates under appropriate conditions.

As appreciated, DMC catalysts are not acidic or alkaline catalysts, but rather are transition metal catalysts which do not need to be neutralized as is the case with the acidic or alkaline catalysts. The DMC catalysts are typically used at a concentration that is lower than the metal concentrations discussed herein for the acidic or alkaline catalysts process, but are still present at a concentration of at least 80 ppm. Because the DMC catalysts are not detrimental to the subsequent preparation of polyurethanes they are allowed to remain with the polyether polyol. Alternatively, removal of the DMC catalyst can be accomplished with an alkali metal hydroxide to form an insoluble salt that is then filtered.

According to another embodiment, the alkoxylated alcohol is an alkoxylated Guerbet alcohol of formula (I)

$$R^2\text{—O—}BO_tPO_u\text{-}EO_w\text{—H} \tag{I}$$

wherein $R^2$ corresponds to an aliphatic, branched hydrocarbon group $C_nH_{2n+1}$ derived from a Guerbet alcohol where n corresponds to the number of carbon atoms and may range from 12 to 50; BO corresponds to a butoxy group; t corresponds to the number of butoxy groups present and may range from 0 to 50; PO corresponds to a propoxy group; u corresponds to the number of propoxy groups present and may range from 0 to 50; EO corresponds to an ethoxy group; and w corresponds to the number of ethoxy groups present and may range from 0 to 50 with the proviso that $t+u+w\geq 1$.

Guerbet alcohols and methods of making them are well known to those skilled in the art. In the course of a Guerbet reaction, primary alcohols are dimerized at high temperatures in the presence of a catalyst to primary alcohol products branched at the 2-position. The reaction proceeds by the following sequential steps: (i) oxidation of the primary alcohol to an aldehyde; (ii) aldol condensation of the aldehyde; (iii) dehydration of the aldol product; and (iv) hydrogenation and reduction of the allylic aldehyde.

The Guerbet reaction may be carried out at a temperature range of about between 175° C.-275° C. Catalysts which may be used include NaOH, KOH, nickel, lead salts, oxides of copper, lead, zinc, chromium, molybdenum, tungsten and manganese, palladium compounds and silver compounds.

The Guerbet alcohol $R^2$—OH is then alkoxylated in the next process step. The procedure for alkoxylation is known in principle to those skilled in the art. It is likewise known to those skilled in the art that the reaction conditions can influence the molecular weight distribution of the alkoxylates.

In one embodiment, the alkoxylated Guerbet alcohol of formula (I) is prepared by base-catalyzed alkoxylation. The Guerbet alcohol is first admixed in a pressure reactor with alkali metal hydroxides, such as potassium hydroxide, or with alkali metal alkoxides, such as sodium methoxide. By means of reduced pressure, for example <100 mbar, and/or an increase in the temperature, for example from 30° C. to 150° C., it is possible to draw off water still present in the mixture. The alcohol is then present as the corresponding alkoxide. This is followed by inertization with inert gas and addition of the alkylene oxide at temperatures between 60° C.-180° C. and up to a pressure of max. 10 bar. At the end of the reaction, the catalyst can be neutralized by adding acid, such as acetic or phosphoric acid, and can be filtered off if required.

In another embodiment, the alkoxylated Guerbet alcohol of formula (I) may be prepared by techniques known to those skilled in the art which leads to narrower molecular weight distributions than in the case of base-catalyzed synthesis. To this end, the catalysts which may be used are, for example, double hydroxide clays, double metal cyanide catalysts, or Zn—Co type catalysts. To perform the reaction, the Guerbet alcohol is admixed with the catalyst and the mixture dewatered as described above and reacted with the alkylene oxides as described above. Generally, not more than 250 ppm of catalyst based on the total weight of the mixture is used. The catalyst can remain in the final product due to this small amount.

In yet another embodiment, the alkoxylated Guerbet alcohol of formula (I) may be prepared using a DMC catalyst or by acid-catalyzed alkoxylation. The acids may be Bronsted or Lewis acids. To perform the reaction, the Guerbet alcohol is admixed with the catalyst, and the mixture dewatered as described above and reacted with alkylene oxides as described above. At the end of the reaction, the acid can be neutralized by adding a base, such as KOH or NaOH, and filtered off if required.

The block structure indicated in formula (I) may be obtained by subsequently adding butylene oxide, propylene oxide, and ethylene oxide in their respective amounts in any order to the Guerbet alcohol. Thus, in one embodiment, the Guerbet alcohol is first butoxylated with t butylene oxide units to form a butyloxated Guerbet alcohol, and then propoxylated with u propylene oxide units and then ethoxylated with w units of ethylene oxide units. In some embodiments, different catalysts may used during alkoxylation, for example, a DMC catalyst may be used during propoxylation while an alkali metal hydroxide may be used during ethoxylation. In other embodiments, the butylene oxide units, propylene oxide units and ethylene oxide units are added to the Guerbet alcohol in random order. The properties of the resultant alkoxylated Guerbet alcohol can be tailored to enhanced oil recovery needs by the skilled artisan by selecting the number of BO, PO and EO units. The alkoxylated Guerbet alcohol of formula (I) will comprise a terminal OH— group.

In one embodiment, the surfactant formulation comprises from about 0.005 to about 10 weight percent of the nonionic surfactant, based on the total weight of the surfactant formulation. In another embodiment, the surfactant formulation comprises from about 0.01 to about 5 weight percent of the nonionic surfactant, based on the total weight of the surfactant formulation. In still another embodiment, the surfactant formulation comprises from about 0.5 to about 3 weight percent of the nonionic surfactant, based on the total weight of the surfactant formulation.

The surfactant formulation further includes an organic acid selected from citric acid, diglycolic acid, glycolic acid and a salt thereof. It has been surprisingly found that the surfactant formulation performs unexpectedly well in very fresh water to very hard, briney water (where TDS can range from 1000 ppm to >200,000 ppm and hardness can range from 0 ppm divalents to 30,000 ppm) when the organic acid or preferably a salt thereof is included in the surfactant formulation.

In some embodiments, the organic acid is selected from diglycolic acid, glycolic acid and a salt thereof. In yet another embodiment, the organic acid is diglycolic acid or a diglycolic acid salt. In still another embodiment, the organic acid is glycolic acid or a glycolic acid salt.

In one particular embodiment, the organic acid is provided as a powder in pure form which is then preferably used in an aqueous solution. In still another embodiment, glycolic acid or glycolic acid salt may be produced from sodium chloroacetate or chloroacetic acid under strong alkaline conditions. In still another embodiment, the organic acid is provided in the form of a salt that can be illustrated by the alkali metal or alkaline earth metal salts, such as sodium, calcium, lithium, magnesium, zinc and potassium, as well as the ammonium and alkanolamine salts such as monoethanolamine and triethanolamine (which it is believed form alkanolammonium salts) salts, and the like and mixtures thereof. In one particular embodiment, the organic acid is a glycolic acid salt, for example, the sodium salt (i.e. sodium glycolate and/or disodium glycolate).

The organic acid or salt thereof can be used in amounts sufficient to effect surfactant formulation stabilization. These can be illustrated by surfactant formulations containing ratios ranging between about 0.05 parts by weight organic acid or a salt thereof to about 15 parts by weight nonionic surfactant to about 2 parts by weight organic acid or a salt thereof to about 10 parts by weight nonionic surfactant, while in other embodiments, the ratios may range between about 0.5 parts by weight organic acid or a salt thereof to about 12 parts by weight nonionic surfactant to about 1.25 parts by weight organic acid or a salt thereof to about 9 parts by weight nonionic surfactant.

The surfactant formulation also includes injection water. In one embodiment, the injection water may be seawater, brine, fresh water from an aquifer, river or lake, or a mixture thereof. Thus, according to many embodiments, the injection water contains minerals, for example, barium, calcium, magnesium, and/or mineral salts, for example, sodium chloride, potassium chloride, magnesium chloride.

It's well known water salinity and/or water hardness may affect recovery of fossil fluids in a formation. As used herein, "salinity" refers to the amount of dissolved solids in the injection water. Thus, in one embodiment, the injection water has a salinity of at least about 20,000 ppm. In another embodiment, the injection water has a salinity of at least about 30,000 ppm. In still another embodiment, the injection water has a salinity of at least about 50,000 ppm. In still a further embodiment, the injection water has a salinity of at least about 100,000 ppm. In a further embodiment, the injection water has a salinity of at least about 200,000 ppm.

According to another embodiment, the surfactant formulation may optionally comprise a co-surfactant. In one embodiment, the co-surfactant is an alkylaryl sulfonate represented by the formula (II):

where $R^a$ is hydrogen or an alkyl group containing from 1 to 3 carbon atoms, $R^b$ is hydrogen or an alkyl group containing from 1 to 3 carbon atoms, $R^c$ is an alkyl group having from 8 to 40 carbon atoms and A is a monovalent cation. In one embodiment, A is an alkali metal ion, an ammonium ion or substituted ammonium ion. Examples of substituted ammonium ions include ammonium independently substituted with from 1 to 4 aliphatic or aromatic hydrocarbyl groups having from 1 to 15 carbon atoms.

The compound of formula (II) may be obtained by the alkylation of an aromatic compound. In one embodiment, the aromatic compound is benzene, toluene, xylene or a mixture thereof. For embodiments where the aromatic compound includes xylene, the xylene compound may be ortho-xylene, meta-xylene, para-xylene, or a mixture thereof.

The aromatic compound may be alkylated with a mixture of normal alpha olefins containing from $C_8$ to $C_{40}$, carbons and in some embodiment, $C_{14}$ to $C_{30}$ carbons to yield an aromatic alkylate. The aromatic alkylate is then sulfonated to form an alkylaromatic sulfonic acid which is then neutralized with a source of alkali or alkaline earth metal or ammonia thereby producing an alkylaryl sulfonate compound. In one embodiment, the source is an alkali metal hydroxide, such as, but not limited to, sodium hydroxide or potassium hydroxide.

Other co-surfactants which may optionally be included in the surfactant formulation are the type derived from alkyl diphenyl oxide sulfonic acids and their salts. Examples include the monoalkyl diphenyl oxide disulfonates, the monoalkyl diphenyl oxide monosulfonates, the dialkyl diphenyl oxide monosulfonates, and the dialkyl diphenyl oxide disulfonates, and their mixtures.

For example, the surfactant formulation may optionally include a co-surfactant of the formula (III):

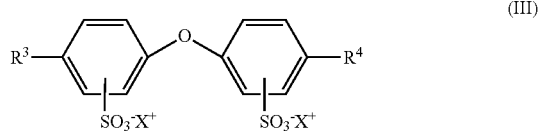

(III)

wherein $R^3$ and $R^4$ are, independently at each occurrence, hydrogen, linear or branched $C_1$-$C_{16}$ alkyl, or aryl; and X is independently hydrogen, sodium or potassium.

Co-surfactants of formula (III) contain a pair of sulfonate groups on a diphenyl oxide backbone. The two sulfonates provide double charge density to the molecule. The double charge provides a more powerful, more durable, and more versatile surfactant molecule when compared to single charge anionics. This higher local charge density results in greater potential for solvating and coupling action. In addition, the flexible ether linkage of the molecule allows variable distance between the sulfonates, allowing interactions with a broad variety of other materials in solution as well as excellent coupling with other surfactants and ingredients.

In one embodiment, one or both of $R_3$ and $R_4$ are preferably independently linear or branched $C_3$-$C_{16}$ alkyl, preferably $C_6$-$C_{16}$ alkyl.

In one embodiment, X at each occurrence is preferably sodium.

Further preferred alkyl diphenyl oxide sulfonic acid based co-surfactants include: disodium hexadecyldiphenyloxide disulfonate; disodium dihexadecyldiphenyloxide disulfonate; sodium dipropyldiphenyleneoxide sulfonate, disodium didecyldiphenylene oxide disulfonate, and disodium mono- and di-sec-hexyldiphenylene oxide disulfonate, as well as their mixtures. Such materials can be readily prepared by a person of ordinary skill in the art, using well known techniques. Suitable procedures are described in U.S. Pat. No. 6,743,764, and references cited therein, which is incorporated herein by reference. Several of the foregoing materials are also commercially available under the DOWFAX™ brand (from The Dow Chemical Company).

In another embodiment, the co-surfactant is an internal olefin sulfonate. An internal olefin is an olefin whose double bond is located anywhere along the carbon chain except at a terminal carbon atom. A linear internal olefin does not have any alkyl, aryl, or alicyclic branching on any of the double bond carbon atoms or on any carbon atoms adjacent to the double bond carbon atoms. Typical commercial products produced by isomerization of alpha olefins are predominantly linear and contain a low average number of branches per molecule.

Examples of commercially available internal olefin sulfonates, include, for instance, Petrostep™ S2, a C15-C18 IOS, is available from Stepan Company and Enordet™ internal olefin sulfonates available from Shell Chemicals and other suppliers.

Internal olefin sulfonates may also be prepared by sulfonation of a $C_6$-$C_{20}$ internal olefin or mixture of internal olefins according to well-known methods. In one suitable approach, sulfonation is performed in a continuous thin-film reactor maintained at 10° C. to 50° C. The internal olefin or mixture is placed in the reactor along with sulfur trioxide diluted with air. The molar ratio of internal olefin to sulfur trioxide is maintained at a suitable ratio, e.g., from about 0.7:1 to about 1.1:1. The sulfonated derivative of internal olefin or mixture may be neutralized with alkali, e.g., sodium hydroxide, to form the corresponding salt. The reaction is exothermic and the viscosity of the reaction product may depend on the amount of water present. General conditions and processes for sulfonation of olefins are disclosed in U.S. Pat. No. 4,252,192, the teachings of which are incorporated herein by reference. The internal olefin used as a source for the $C_6$-$C_{20}$ internal olefin sulfonate can be di-, tri-, or tetrasubstituted with linear or branched alkyl groups. Internal olefin sources can be obtained from a variety of processes, including olefin (e.g., ethylene, propylene, butylene) oligomerization, a-olefin metathesis, Fischer-Tropsch processes, catalytic dehydrogenation of long-chain paraffins, thermal cracking of hydrocarbon waxes, and dimerized vinyl olefin processes. A well-known ethylene oligomerization process is the Shell higher olefin process (SHOP), which combines ethylene oligomerization to form a-olefins, isomerization of the a-olefins to form internal olefins, and metathesis of these internal olefins with butenes or ethylene to form a-olefins of different chain lengths. Commercially available internal olefins made by SHOP typically contain about six mole percent or higher of trisubstituted internal olefins. Internal olefin sulfonates and their preparation are described in many references, including U.S. Pat. Nos. 4,532,053, 4,555,351, 4,597,879, and 4,765,408, and U.S. Pat. Appl. Publ. No. 2010/0282467, the teachings of which are incorporated by reference.

In one aspect, the internal olefin used to make the internal olefin sulfonate is produced by metathesis of an α-olefin and has a high proportion of disubstitution and a correspondingly low proportion of trisubstitution. Such internal olefin sulfonates, which are disclosed in U.S. Pat. Appl. Publ. No. 2010/0282467, provide advantages for enhanced oil recovery, including lower optimal salinities.

According to one embodiment, the co-surfactant is added to the surfactant formulation at a ratio of between about 1:20 parts by weight of co-surfactant to nonionic surfactant to about 1:1 parts by weight of co-surfactant to nonionic surfactant. In another embodiment, the co-surfactant is added to the surfactant formulation at a ratio of about 1:15 parts by weight of co-surfactant to nonionic surfactant to about 1:5 parts by weight of co-surfactant to nonionic surfactant. In still another embodiment, the co-surfactant is added to the surfactant formulation at a ratio of about 1:12.5 parts by weight of co-surfactant to nonionic surfactant to about 1:7.5 parts by weight of co-surfactant to nonionic surfactant.

The surfactant formulation may further optionally include a dialkyl sulfosuccinate represented by the formula (N):

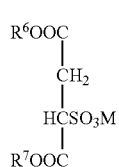

(IV)

where $R^6$ and $R^7$ are each independently an alkyl group containing 5 to 13 carbon atoms and M is an alkali metal ion, an alkaline earth metal ion, an ammonium ion or a substituted ammonium ion. Examples of substituted ammonium ions include ammonium independently substituted with from 1 to 4 aliphatic or aromatic hydrocarbyl groups having from 1 to 15 carbon atoms.

According to one embodiment, $R^6$ and $R^7$ are independently a $C_5$ alkyl, a $C_6$ alkyl, a $C_8$ alkyl or a $C_{13}$ alkyl. These groups may be derived, for example, from respectively, amyl alcohol, methyl amyl alcohol (1,4-dimethyl butyl alcohol), 2-ethyl hexanol, and mixed isomers of alcohols.

In another embodiment, M is an alkali metal ion or alkaline earth metal ion. In a further embodiment, M is sodium.

According to one embodiment, the dialkyl sulfosuccinate is added to the surfactant formulation at a ratio of between about 1:15 parts by weight of dialkyl sulfosuccinate to nonionic surfactant to about 1:10 parts by weight of dialkyl sulfosuccinate to nonionic surfactant. In still another embodiment, the dialkyl sulfosuccinate is added to the surfactant formulation at a ratio of between about 1:7.5 parts by weight of dialkyl sulfosuccinate to nonionic surfactant to about 1:5 parts by weight of dialkyl sulfosuccinate to nonionic surfactant. In a further embodiment, the dialkyl sulfosuccinate is added to the surfactant formulation at a ratio of between about 1:2.5 parts by weight of dialkyl sulfosuccinate to nonionic surfactant to about 1:1 parts by weight of dialkyl sulfosuccinate to nonionic surfactant.

In another embodiment, the surfactant formulation may optionally include a solvent. Examples of solvents include, but are not limited to, alcohols, such as lower carbon chain alcohols, for example, isopropyl alcohol, ethanol, n-propyl alcohol, n-butyl alcohol, sec-butyl alcohol, n-amyl alcohol, sec-amyl alcohol, n-hexyl alcohol, and sec-hexyl alcohol; lower carbon chain alcohols that have been alkoxylated with ethylene oxide (EO), propylene oxide (PO) or butylene oxide (BO), for example, n-butanol+1EO, n-butanol+2EO, n-butanol+3EO, n-hexanol+6EO, 2-ethylhexanol+2EO and iso-butanol+3EO, alcohol ethers, polyalkylene alcohol ethers, such as ethylene glycol monobutyl ether, polyalkylene glycols, such as ethylene glycol and propylene glycol, poly(oxyalkylene) glycols, such as diethylene glycol, poly(oxyalkylene) glycol ethers, or any mixtures thereof.

In one embodiment, the solvent is added to the surfactant formulation at a ratio of between about 20:1 parts by weight of solvent to nonionic surfactant to about 1:1 parts by weight of solvent to nonionic surfactant. In another embodiment, the solvent is added to the surfactant formulation at a ratio of between about 15:1 parts by weight of solvent to nonionic surfactant to about 2.5:1 parts by weight of solvent to nonionic surfactant. In still another embodiment, the solvent is added to the surfactant formulation at a ratio of between about 10:1 parts by weight of solvent to nonionic surfactant to about 5:1 parts by weight of solvent to nonionic surfactant.

In yet another embodiment, the surfactant formulation may optionally include a chelant, or a polymer.

Examples of chelants which may be used include, but are not limited to, EDTA, EDTA salts, EDDS, EDDS salts, phosphate compounds, ascorbic acid, tetrasodium iminodisuccinate, citric acid, dicarboxymethylglutamic acid, maleic acid, diethylenetriaminepentacetic acid, cyclohexan trans-1, 2-diaminetetraacetic acid, ethanoldiglycine, diethanolglycine, hydroxyethyl-ethylene-diaminetriacetic acid, ethylene bis [2-(o-hydroxyphenyl)-glycine], nitrilotriacetic acid (NTA), a nonpolar amino acid, methionine, oxalic acid, a polar amino acid, arginine, asparagine, aspartic acid, glutamic acid, glutamine, lysine, ornithine, a siderophore, desferrioxamine B, hydrolysed wool, succinic acid, sodium metaborate, sodium silicate, sodium orthosilicate, and any mixture thereof.

In one particular embodiment, the surfactant formulation is substantially free of EDTA, EDTA salts and phosphate compounds.

According to another embodiment, the surfactant formulation comprises from about 0 to about 10 weight percent of chelant, based on the total weight of the surfactant formulation. In another embodiment, the surfactant formulation comprises from about 0.01 to about 5 weight percent of chelant, based on the total weight of the surfactant formulation. In yet another embodiment, the surfactant formulation comprises from about 0.1 to about 3 weight percent of chelant, based on the total weight of the surfactant formulation.

Examples of polymers include, but are not limited to, polyacrylamides, partially hydrolyzed polyacrylamide, polyacrylates, ethylenic copolymers, biopolymers, carboxymethylcellulose, polyvinyl alcohols, polystyrene sulfonates, polyvinylpyrrolidone, AMPS (2-acrylamide-2-methyl propane sulfonates), modified starches and mixtures thereof. Examples of ethylenic copolymers include copolymers of acrylic acid and acrylamide, acrylic acid and lauryl acetylate, lauryl acrylate and acrylamide. Examples of biopolymers include xanthan gum and guar gum.

In one embodiment, the surfactant formulation comprises from about 0 to about 2 weight percent of polymer, based on the total weight of the surfactant formulation. In another embodiment, the surfactant formulation comprises from about 0.01 to about 1 weight percent of polymer, based on the total weight of the surfactant formulation. In still another embodiment, the surfactant formulation comprises from about 0.2 to about 0.5 weight percent of polymer, based on the total weight of the surfactant formulation.

In still another embodiment, the surfactant formulation may optionally include an alkali metal hydroxide, carbonate or chloride. The addition of such materials can: alter the surface properties of the formation so that surfactant retention is reduced; provide stability to ether sulfates from hydrolysis; activate surfactants in the crude oil; and raise the salinity of the injection water so a salinity gradient is achieved as the formulation propagates through the formation. In one embodiment, the alkali metal hydroxide, carbonate or chloride is added to the surfactant formulation prior to being pumped into the fossil fluid-bearing subterranean formation. In another embodiment, the surfactant formulation contains from about 0.01 weight percent to about 2 weight percent, for e.g., from about 0.05 weight percent to about 1.5 weight percent or from about 0.01 weight percent to about 1 weight percent, of alkali metal hydroxide, carbonate or chloride based on the total weight of the surfactant formulation.

The surfactant formulation may be prepared by a process of mixing the nonionic surfactant with an organic acid selected from citric acid, diglycolic acid, glycolic acid, and a salt thereof and injection water. The components may be mixed together in any order using customary devices, such as, but not limited to, a stirred vessel or static mixer.

In another embodiment, there is provided a method for designing a surfactant formulation for use in recovering fossil fluids from a subterranean formation. The method includes measuring the temperature of the subterranean formation, measuring the interfacial tension in the injection water and fossil fluid, adding a nonionic surfactant to the injection water to decrease the interfacial tension in the injection water and fossil fluid to less than $1 \times 10^{-1}$ dynes/cm, and adding an organic acid selected from citric acid, diglycolic acid, glycolic acid and a salt thereof to the mixture of injection water and nonionic surfactant in an amount necessary to make the mixture phase stable at the temperature of the subterranean formation. In one embodiment, the injection water has a salinity of at least about 20,000 ppm and the subterranean formation is at a temperature in the range between about 80° F. to about 300° F., while in other embodiments the formation is at a temperature in the range between about 125° F. to about 300° F.

In another embodiment, there is provided a surfactant package for treating a fossil fluid-bearing subterranean formation comprising a nonionic surfactant, an organic acid selected from citric acid, diglycolic acid, glycolic acid and a salt thereof and injection water. In a further embodiment, the surfactant package comprises an alkoxylated alkylphenol, alkoxylated alcohol or alkoxylated Guerbet alcohol of formula (I) described above and glycolic acid or a salt thereof. In some embodiments, the surfactant package can be further combined with injection water and optional components described above to form a surfactant formulation.

The surfactant formulation described herein may be injected into one or more injection wells located within the subterranean formation such that fossil fluid is subsequently produced from one or more producing wells. In one embodiment, the injection well and producing well are the same well. In another embodiment, the injection well and producing well are adjacent to one another. In one embodiment, the subterranean formation temperature conditions are between about 80° F. and about 300° F., preferably between about 125° F. and about 300° F.

Consideration must be given to the fact that although this disclosure has been described and disclosed in relation to certain preferred embodiments, obvious equivalent modifications and alterations thereof will become apparent to one of ordinary skill in this art upon reading and understanding this specification and the claims appended hereto. The present disclosure includes the subject matter defined by any combination of any one of the various claims appended hereto with any one or more of the remaining claims, including the incorporation of the features and/or limitations of any dependent claim, singly or in combination with features and/or limitations of any one or more of the other dependent claims, with features and/or limitations of any one or more of the independent claims, with the remaining dependent claims in their original text being read and applied to any independent claim so modified. This also includes combination of the features and/or limitations of one or more of the independent claims with the features and/or limitations of another independent claim to arrive at a modified independent claim, with the remaining dependent claims in their original text being read and applied to any independent claim so modified. Accordingly, the presently disclosed invention is intended to cover all such modifications and alterations, and is limited only by the scope of the claims which follow, in view of the foregoing and other contents of this specification.

What is claimed is:

1. A process for recovering fossil fluids from a fossil fluid-bearing subterranean formation comprising injecting a surfactant formulation comprising a nonionic surfactant, an organic acid selected from the group consisting of diglycolic acid, glycolic acid and a salt thereof, and injection water, wherein the organic acid and nonionic surfactant are present at a ratio ranging between about 0.05 parts by weight organic acid/15 parts by weight nonionic surfactant to about 2 parts by weight organic acid/10 parts by weight nonionic surfactant into one or more injection wells such that oil is subsequently produced from one or more producing wells and wherein the nonionic surfactant is an alkoxylated alkylphenol comprising 10 to 30 alkylene oxide units and wherein the surfactant formulation further comprises an alkylaryl sulfonate represented by the formula (II)

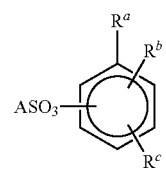

(II)

wherein $R^a$ is hydrogen or an alkyl group containing 1 to 3 carbon atoms, $R^b$ is hydrogen or an alkyl group containing 1 to 3 carbon atoms, $R^c$ is an alkyl group containing 8 to 40 carbon atoms and A is a monovalent cation and wherein the alkylaryl sulfonate is added to the surfactant formulation at a ratio of between about 1:15 parts by weight of alkylaryl sulfonate to nonionic surfactant to about 1:5 parts by weight of alkylaryl sulfonate to nonionic surfactant.

2. The process of claim 1, wherein the alkoxylated alkylphenol has one or more linear or branched $C_1$ to $C_{25}$ alkyl groups attached.

3. The process of claim 1, wherein the nonionic surfactant is an alkoxylated linear or branched saturated aliphatic alcohol compound comprising 5 to 30 carbon atoms.

4. The process of claim 1, wherein the nonionic surfactant is an alkoxylated Guerbet alcohol of formula (I)

$$R^2\text{—O—BO}_t\text{—P}_u\text{-EO}_w\text{—H} \quad (I)$$

wherein $R^2$ corresponds to an aliphatic, branched hydrocarbon group $C_nH_{2n+1}$ derived from a Guerbet alcohol where n ranges from 12 to 36; BO corresponds to a butoxy group; t is a number ranging from 0 to 50; PO corresponds to a propoxy group; u is a number ranging from 0 to 50; EO corresponds to an ethoxy group; and w is a number ranging from 0 to 50 with the proviso that $t+u+w \geq 1$.

5. The process according to claim 1, wherein the organic acid is glycolic acid or a glycolic acid salt.

6. The process according to claim 5, wherein the glycolic acid salt is at least one of sodium glycolate and disodium glycolate.

7. The process according to claim 1, wherein the injection water is seawater, brine, fresh water from an aquifer, river or lake, or a mixture thereof.

8. The process according to claim 1, wherein the surfactant formulation further comprises an alkali metal hydroxide, alkali metal carbonate, or alkali metal chloride.

9. The process according to claim 1, wherein the alkylaryl sulfonate is added to the surfactant formulation at a ratio of between about 1:12.5 parts by weight of alkylaryl sulfonate to nonionic surfactant to about 1:7.5 parts by weight of alkylaryl sulfonate to nonionic surfactant.

10. The process according to claim 1, wherein the organic acid and nonionic surfactant are present at a ratio ranging between about 0.05 parts by weight organic acid/15 parts by weight nonionic surfactant to about 1.25 parts by weight organic acid/9 parts by weight nonionic surfactant.

11. The process according to claim 3, wherein the alkoxylated linear or branched saturated aliphatic alcohol comprises 10 to 30 alkylene oxide units.

12. The process according to claim 1, wherein the surfactant formulation further comprises a solvent.

13. The process according to claim 1, wherein the subterranean formation temperature condition is between about 80° F. and about 300° F.

14. The process according to claim 1, wherein the injection well and producing well are the same well.

15. The process according to claim 1, wherein the injection well and producing well are adjacent to one another.

\* \* \* \* \*